(12) United States Patent
Yang et al.

(10) Patent No.: US 11,820,320 B2
(45) Date of Patent: Nov. 21, 2023

(54) SYSTEM AND METHOD FOR IMPROVING SAFETY OF OCCUPANT BY AIRBAG

(71) Applicant: ZF Automotive Technologies (Shanghai) Co., Ltd., Shanghai (CN)

(72) Inventors: Hui Yang, Shanghai (CN); Zhenfei Wang, Shanghai (CN); Yuanyi Cheng, Shanghai (CN)

(73) Assignee: ZF Automotive Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/917,186

(22) PCT Filed: Apr. 9, 2021

(86) PCT No.: PCT/CN2021/086052
§ 371 (c)(1),
(2) Date: Oct. 5, 2022

(87) PCT Pub. No.: WO2021/204228
PCT Pub. Date: Oct. 14, 2021

(65) Prior Publication Data
US 2023/0142012 A1    May 11, 2023

(30) Foreign Application Priority Data

Apr. 10, 2020 (CN) .......................... 202010277573.4

(51) Int. Cl.
*B60R 21/263* (2011.01)
*B60R 21/015* (2006.01)
(Continued)

(52) U.S. Cl.
CPC ........ *B60R 21/263* (2013.01); *B60R 21/0134* (2013.01); *B60R 21/01538* (2014.10);
(Continued)

(58) Field of Classification Search
CPC ........... B60R 21/263; B60R 21/01538; B60R 21/01552; B60R 21/0134; B60R 2021/01286; B60R 2021/2636
See application file for complete search history.

(56) References Cited

U.S. PATENT DOCUMENTS 5,439,249 A * 8/1995 Steffens, Jr. ...... B60R 21/01526
280/739
9,399,441 B2 * 7/2016 Jaradi ................... B60R 21/263
(Continued)

FOREIGN PATENT DOCUMENTS

CN          103043021 A      4/2013
CN          106184092 A      12/2016
(Continued)

OTHER PUBLICATIONS

International Search Report and Written Opinion for PCT/CN2021/086052 dated Jul. 14, 2021 (10 pages; with English translation).

*Primary Examiner* — Gertrude Arthur Jeanglaude
(74) *Attorney, Agent, or Firm* — Kristin L. Murphy

(57) ABSTRACT

There is provided a system for improving safety of an occupant by an airbag, which can provide adaptive protection for occupants in different seat positions and different sitting postures. Further, there is provided a method for improving safety of an occupant by an airbag. Further, there is provided a computer-readable medium. The system for improving safety of an occupant by an airbag includes an in-vehicle observation system, an inflatable restraint system, a collision prediction system, and an integrated safety domain control unit. The integrated safety domain control unit formulates a deployment strategy based on data transmitted from the in-vehicle observation system, the inflatable restraint system, and the collision prediction system, to
(Continued)

selectively inflate at least one airbag assembly and control an inflation volume for the airbag assembly to be inflated.

18 Claims, 4 Drawing Sheets

(51) Int. Cl.
    *B60R 21/0134* (2006.01)
    *B60R 21/01* (2006.01)
(52) U.S. Cl.
    CPC ............... *B60R 21/01552* (2014.10); *B60R 2021/01286* (2013.01); *B60R 2021/2636* (2013.01)

(56) References Cited

U.S. PATENT DOCUMENTS

| | | | | |
|---|---|---|---|---|
| 2011/0246156 | A1* | 10/2011 | Zecha | G06V 40/23 |
| | | | | 703/6 |
| 2014/0163825 | A1 | 6/2014 | Kim et al. | |
| 2019/0111880 | A1* | 4/2019 | Choi | B60R 21/013 |

FOREIGN PATENT DOCUMENTS

| | | | |
|---|---|---|---|
| CN | 106560353 | A | 4/2017 |
| CN | 106926806 | A | 7/2017 |
| CN | 107719290 | A | 2/2018 |
| CN | 109421641 | A | 3/2019 |
| CN | 110276932 | A | 9/2019 |
| CN | 110816464 | A | 2/2020 |
| KR | 102090486 | B1 | 3/2020 |
| WO | 2019121231 | A1 | 6/2019 |

* cited by examiner

SYSTEM AND METHOD FOR IMPROVING SAFETY OF OCCUPANT BY AIRBAG

CROSS-REFERENCE TO RELATED APPLICATIONS

This application is a national stage of International Application No. PCT/CN2021/086052, filed Apr. 9, 2021, the disclosure of which is incorporated herein by reference in its entirety, and which claims priority to China Patent Application No. 202010277573.4, filed Apr. 10, 2020, the disclosure of which is incorporated herein by reference in its entirety.

TECHNICAL FIELD

The present disclosure relates to a system and method for improving safety of an occupant by an airbag.

BACKGROUND

An airbag system is a passive safety protection system, which is usually used in cooperation with a seat belt, to provide effective anti-collision protection for an occupant. According to statistics, a vehicle airbag may reduce the rate of head injuries by 25% and the rate of facial injuries by about 80% in the event of a vehicle collision.

In order to improve safety, more types of airbags and their mounting positions are provided in some vehicles. For example, the patent application with the publication number of CN 104691487 A describes an airbag assembly. The airbag assembly is provided with airbags arranged on the head, torso and knees, which are expanded in the event of a collision and provide uniform structural cushioning energy and protection for front occupant's head, torso and lower extremities.

However, the inventors have found that with the development of autonomous driving, seat positions and sitting postures of occupants will change greatly. In existing vehicles, in-vehicle airbag assemblies work independently of each other, can neither cooperate with nor support each other, and cannot provide protection for occupants of different body shapes in different seat positions and different sitting postures according to different collision situations. Therefore, there is an urgent need for an airbag system to protect occupants in different seat positions and different sitting postures.

SUMMARY

What is needed is a system for improving safety of an occupant by an airbag, which can provide adaptive protection for occupants in different seat positions and different sitting postures.

A method for improving safety of an occupant by an airbag is also needed, which can provide adaptive protection for occupants in different seat positions and different sitting postures.

A further need exists for a computer-readable medium, which can implement the method for improving safety of an occupant by an airbag.

Accordingly, an exemplary arrangement of a system for improving safety of an occupant by an airbag includes:
an in-vehicle observation system configured to acquire in-vehicle occupant posture data and/or in-vehicle occupant body shape data and/or in-vehicle seat posture data and/or in-vehicle occupant mental state data;
an inflatable restraint system, which includes a plurality of airbag assemblies; and
a collision prediction system, which includes:
a vehicle external information monitoring module configured to monitor an obstacle around a vehicle body;
a vehicle body posture monitoring module configured to monitor vehicle body motion and a vehicle body posture; and
an integrated safety domain control unit configured to: calculate a collision probability and a collision moment between the vehicle body and the obstacle, and a position of collision between the vehicle body and the obstacle based on the vehicle external information monitoring module and the vehicle body posture monitoring module; and receive the data acquired by the in-vehicle observation system, and formulate a deployment strategy prior to the collision moment based on at least one piece of the received data,
where the deployment strategy includes:
selectively inflating at least one of the airbag assemblies of the inflatable restraint system based on the in-vehicle occupant posture data and/or the in-vehicle occupant body shape data and/or the in-vehicle seat posture data;
selectively inflating at least one of the airbag assemblies of the inflatable restraint system based on the position of collision; and
controlling an inflation volume for the airbag assembly to be inflated based on a seat position and/or a sitting posture of an occupant.

In one or more exemplary implementations, the collision prediction system further includes an Internet-of-vehicles module, which provides external information of the vehicle body together with the vehicle external information monitoring module.

In one or more exemplary implementations, the integrated safety domain control unit provides a collision determination based on the in-vehicle occupant mental state data and the collision probability, and if a result of the collision determination indicates Yes, the integrated safety domain control unit formulates a reminder strategy based on the collision determination,
the reminder strategy including pre-inflating the airbag assembly prior to the collision moment.

In one or more exemplary implementations, the vehicle external information monitoring module includes one or a combination of a millimeter wave radar, an ultrasonic radar, a laser radar, and an external camera.

In one or more exemplary implementations, the vehicle body posture monitoring module includes a speed sensor, a yaw velocity sensor, and a steering wheel angle sensor,
where the speed sensor is configured to monitor the vehicle body motion, and the yaw velocity sensor and the steering wheel angle sensor are configured to monitor the vehicle body posture.

In one or more exemplary implementations, the integrated safety domain control unit includes a modeling unit and a calculation unit, where the modeling unit is configured to model the obstacle based on monitoring information from the vehicle external information monitoring module, and to model the vehicle body based on monitoring information from the vehicle body posture monitoring module; and
the calculation unit is configured to calculate the collision probability based on modeling information.

In one or more exemplary implementations, the system further includes a cloud database and a simulation database, where the cloud database is configured to provide historical data of a vehicle collision, and the simulation database is configured to provide simulation data of the vehicle collision based on the modeling information; and the calculation unit calculates a relative speed and a collision overlap rate between the vehicle body and the obstacle during the collision based on the historical data and the simulation data.

In one or more exemplary implementations, the in-vehicle observation system includes an image acquisition unit and a state capture unit, where the image acquisition unit is configured to acquire the in-vehicle occupant posture data, the in-vehicle occupant body shape data, and the in-vehicle seat posture data; and the state capture unit is configured to acquire the in-vehicle occupant mental state data.

In one or more exemplary implementations, the image acquisition unit is either or a combination of a 3D camera and a 2D camera.

In one or more exemplary implementations, the state capture unit is a camera and/or an in-vehicle radar.

In one or more exemplary implementations, the in-vehicle occupant posture data includes occupant torso position data and/or occupant joint position data.

In one or more exemplary implementations, the in-vehicle seat posture data includes either or a combination of seat position data and seat back angle data.

In one or more exemplary implementations, the mental state data includes either or a combination of occupant health state data and occupant facial data.

In one or more exemplary implementations, the system further includes a collision sensor, where the collision sensor is configured to monitor vehicle body collision information and vehicle body collision degree information and to transmit the information to the integrated safety domain control unit, and the integrated safety domain control unit controls, based on the received information, the inflatable restraint system to inflate the airbag assembly according to the deployment strategy.

The method for improving safety of an occupant by an airbag includes the following steps:
   acquiring in-vehicle occupant posture data and/or in-vehicle occupant body shape data and/or in-vehicle seat posture data and/or in-vehicle occupant mental state data;
   providing monitoring data of an obstacle around a vehicle body;
   capturing vehicle body motion and a vehicle body state;
   calculating a collision probability and a collision moment between a vehicle and the obstacle, and a position of collision between the vehicle body and the obstacle based on the obstacle around the vehicle body, the vehicle body motion, and the vehicle body state; and
   formulating a deployment strategy, which includes:
   selectively inflating at least one of the airbag assemblies of the inflatable restraint system based on the in-vehicle occupant posture data and/or the in-vehicle occupant body shape data and/or the in-vehicle seat posture data;
   selectively inflating at least one of the airbag assemblies of the inflatable restraint system based on the position of collision; and
   controlling an inflation volume for the airbag assembly to be inflated based on a seat position and/or a sitting posture of an occupant.

In one or more exemplary implementations, the method for improving safety of an occupant further includes:
   determining, based on the in-vehicle occupant mental state data, the collision probability, and the collision moment, whether the occupant is aware of a possibility of a collision, and if not, pre-inflating the airbag assembly.

In one or more implementations, the method for improving safety of an occupant further includes:
   executing the deployment strategy based on a collision signal detected by a collision sensor; and
   uploading a post-collision data record to a cloud database.

There is also provided a computer-readable medium having computer instructions stored thereon, where when the computer instructions are executed by a processor, the steps of the method for improving safety of an occupant by an airbag as described in any one of the foregoing exemplary arrangements are implemented.

The beneficial effects of the present disclosure are as follows.

The in-vehicle observation system is used to sense the respective positions and states of the occupant in the vehicle and the seat in the vehicle in real time, so that the airbag deployment strategy can be truly and reliably formulated. The position of collision between the vehicle body and the obstacle is calculated to further reasonably optimize the establishment of the airbag deployment strategy before the collision occurs, so that a right airbag is adaptively deployed to a proper size based on the position of collision, thereby providing an optimal protection strategy for the occupant.

BRIEF DESCRIPTION OF DRAWINGS

Specific features and performances of the present disclosure are further given by the following exemplary arrangements and accompanying drawings.

DETAILED DESCRIPTION

Figure 1:
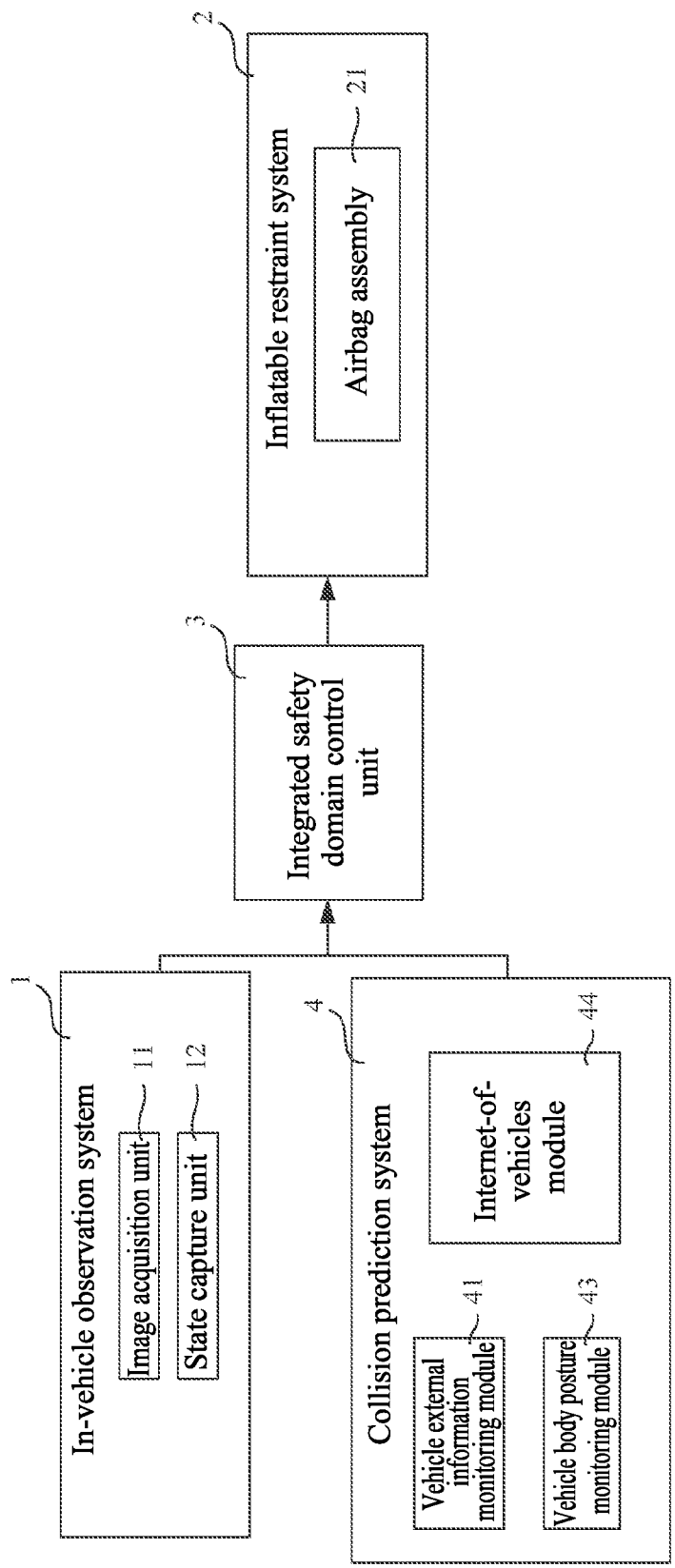
FIG. 1 is a schematic diagram of the present system in an exemplary implementation.

A variety of different exemplary implementations or arrangements for implementing the technical solutions of the described subject matter are disclosed below. In order to simplify the disclosure, specific instances of various elements and arrangements are described below, which are, of course, only examples and are not intended to limit the scope of protection of the present application. For example, a first feature described later in the specification being formed above or on a second feature may include an implementation in which the first feature is directly connected to the second feature, and may also include an implementation in which an additional feature is formed between the first feature and the second feature, such that the first feature may be not directly connected to the second feature. Additionally, reference numerals and/or letters may be repeated in various examples throughout the disclosure. The repetition is for brevity and clarity, and does not in itself represent a relationship between the implementations and/or structures to be discussed. Further, when a first element is described as being connected or combined with a second element, this indicates that it includes an implementation in which the first element and the second element are directly connected or combined with each other, and also includes an implementation in which the first element and the second element are indirectly connected or combined with each other by means of one or more other intervening elements.

Exemplary Arrangement 1

The following exemplary arrangement of the present system is understood with reference to FIG. 1. The system for improving safety of an occupant by an airbag includes: an in-vehicle observation system 1, an inflatable restraint system 2, an integrated safety domain control unit 3, and a collision prediction system 4.

The in-vehicle observation system 1 is configured to acquire one or a combination of in-vehicle occupant posture data, in-vehicle occupant body shape data, in-vehicle seat posture data, and in-vehicle occupant mental state data.

The inflatable restraint system 2 includes a plurality of airbag assemblies 21, where the airbag assembly 21 may be composed of an airbag, a gas generator, and an igniter. A gas generant in the gas generator is ignited by the igniter to generate a large volume of gas for airbag filling, so that an airbag is expanded rapidly within a very short period of time, to form an elastic cushion, and releases and deflates in a timely manner, to absorb impact energy, thereby effectively protecting a human body from injury or mitigating the severity of injury. Certainly, in another exemplary arrangement, the airbag assembly 21 may also be composed of an inflator pump, a high-pressure gas storage tank, and an airbag, where the airbag is inflated through the high-pressure gas storage tank. The plurality of airbag assemblies 21 may be located in a plurality of positions in a vehicle after expansion. For example, the airbag assemblies 21 may include at least one or a combination of: a front airbag that is located directly in front of an occupant after expansion, an adaptive knee airbag that is located below the knees of the occupant after expansion, a seat cushion airbag that is located under a seat cushion of the occupant after expansion, an active foot airbag that is located around the feet of the occupant after expansion, a curtain airbag that is located between the occupant and a vehicle window after expansion, and a side airbag that is located between a driver and the occupant after expansion.

The collision prediction system 4 includes a vehicle external information monitoring module 41 and a vehicle body posture monitoring module 43. The vehicle external information monitoring module 41 is configured to monitor an obstacle around a vehicle body, and the vehicle body posture monitoring module 43 is configured to monitor vehicle body motion and a vehicle body posture.

The vehicle body posture monitoring module 43 includes a speed sensor, a yaw velocity sensor, and a steering wheel angle sensor, where the speed sensor is configured to monitor the vehicle body motion, and the yaw velocity sensor and the steering wheel angle sensor are configured to monitor the vehicle body posture.

Specifically, in some exemplary implementations, the vehicle external information monitoring module 41 includes one or a combination of a millimeter wave radar, a laser radar, and an external camera. The millimeter wave radar and the laser radar are configured to locate an obstacle and acquire data, such as a speed, an angle, and a distance, of the obstacle. The millimeter wave radar is not susceptible to interference from weather and has a long detection range, and can monitor the obstacle in a long range. The laser radar is higher in terms of precision and simple in terms of data processing, and can complement the information acquired by millimeter wave radar in terms of data content and precision, so that a monitoring result is more accurate. The external camera is configured to acquire image information of the obstacle, for use in distinguishing and identification of the obstacle.

The integrated safety domain control unit 3 is configured to calculate a collision probability and a collision moment between the vehicle body and the obstacle, and a position of collision between the vehicle body and the obstacle based on the vehicle external information monitoring module 41 and the vehicle body posture monitoring module 43. At the same time, the integrated safety domain control unit 3 receives the data acquired by the in-vehicle observation system 1, and formulates a deployment strategy prior to the collision moment based on the received data. The data received by the integrated safety domain control unit 3 may be one or a combination of the in-vehicle occupant posture data, the in-vehicle seat posture data, and the in-vehicle occupant mental state data.

Specifically, in some exemplary implementations, the integrated safety domain control unit 3 may include a modeling unit and a calculation unit. The modeling unit models the obstacle and the vehicle body, respectively. Specifically, the modeling unit fuses the data acquired by the millimeter wave radar, the laser radar, and the external camera, to continuously model the obstacle in real time. In addition, the modeling unit continuously models the traveling vehicle body in real time based on vehicle body motion information monitored by the speed sensor, vehicle body yaw angular velocity information monitored by the yaw velocity sensor, and vehicle steering wheel angle information monitored by the steering wheel angle sensor.

The calculation unit compares obstacle modeling information and vehicle body modeling information, which are updated in real time, to calculate the collision probability and collision moment information. In the meantime, the calculation unit will update calculation results in real time during calculation, and continuously compare the calculation results with real-time observation results, to improve the calculation accuracy with reduced errors.

The deployment strategy includes: selectively inflating at least one of the airbag assemblies 21 of the inflatable restraint system based on the in-vehicle occupant posture data and/or the in-vehicle occupant body shape data and/or the in-vehicle seat posture data, and selectively inflating at least one of the airbag assemblies 21 of the inflatable restraint system based on the position of collision; and controlling an inflation volume for the airbag assembly to be inflated based on a seat position and/or a sitting posture of an occupant. Specifically, the at least one of the airbag assemblies 21 of the inflatable restraint system 2 may be selectively inflated based on the seat position and/or the sitting posture of the occupant, and the inflation volume for the airbag assembly 21 to be inflated may be controlled based on the seat position and/or the sitting posture of the occupant.

An exemplary arrangement of the deployment strategy may be as follows. A distance between the occupant and a seat back that is acquired by the in-vehicle observation system 1 is a first distance, and if the first distance is greater than a first threshold, it is determined that the occupant is in a first posture, and at the same time, the integrated safety domain control unit 3 obtains, through calculation, the position of collision as a first part of the vehicle body. In this case, the integrated safety domain control unit 3 formulates a first posture deployment strategy, which includes selectively inflating a first airbag assembly and controlling the inflation volume to be a first posture inflation volume.

A further exemplary arrangement of the deployment strategy may be as follows. If a distance between the occupant and a seat back that is acquired by the in-vehicle observation system 1 is a second distance, and an in-vehicle seat is in a second position, it is determined that the occupant is in a second posture, and the obtained position of collision is a second part of the vehicle body. In this case, the integrated safety domain control unit 3 formulates a second posture deployment strategy, which includes selectively inflating an airbag assembly and controlling the inflation volume to be a second posture inflation volume.

A still further exemplary arrangement of the deployment strategy may be as follows. When a possible position of collision is a third part of the vehicle body, the in-vehicle seat is in a third position, and the occupant has a small body size, or the occupant is at a farther distance from the interior front of the vehicle, the integrated safety domain control unit 3 will formulate a third posture deployment strategy prior to the collision moment, so that the airbag corresponding to the third part of the vehicle body is deployed with a larger size, and can then make a contact with the body of the occupant earlier.

It will be appreciated that the integrated safety domain control unit 3 as in the previous implementation may include one or a combination of one or more hardware processors, such as a system-on-chip (SOC), a microcontroller, a microprocessor (e.g., an MCU chip or a 51 single-chip microcomputer), a reduced instruction set computer (RISC), an application specific integrated circuit (ASIC), an application specific instruction integrated processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, etc.

The in-vehicle observation system 1 includes an image acquisition unit 11 and a state capture unit 12, where the image acquisition unit 11 is configured to acquire the in-vehicle occupant posture data, the in-vehicle seat posture data, and the in-vehicle occupant body shape data; and the state capture unit 12 is configured to acquire the in-vehicle occupant mental state data. Specifically, the image acquisition unit 11 is either or a combination of a 3D camera and a 2D camera.

The in-vehicle occupant posture data that is acquired by the image acquisition unit 11 includes occupant torso position data, or occupant joint position data, or a combination thereof.

The in-vehicle seat posture data that is acquired by the image acquisition unit 11 includes either or a combination of seat position data and seat back angle data.

Figure 2:
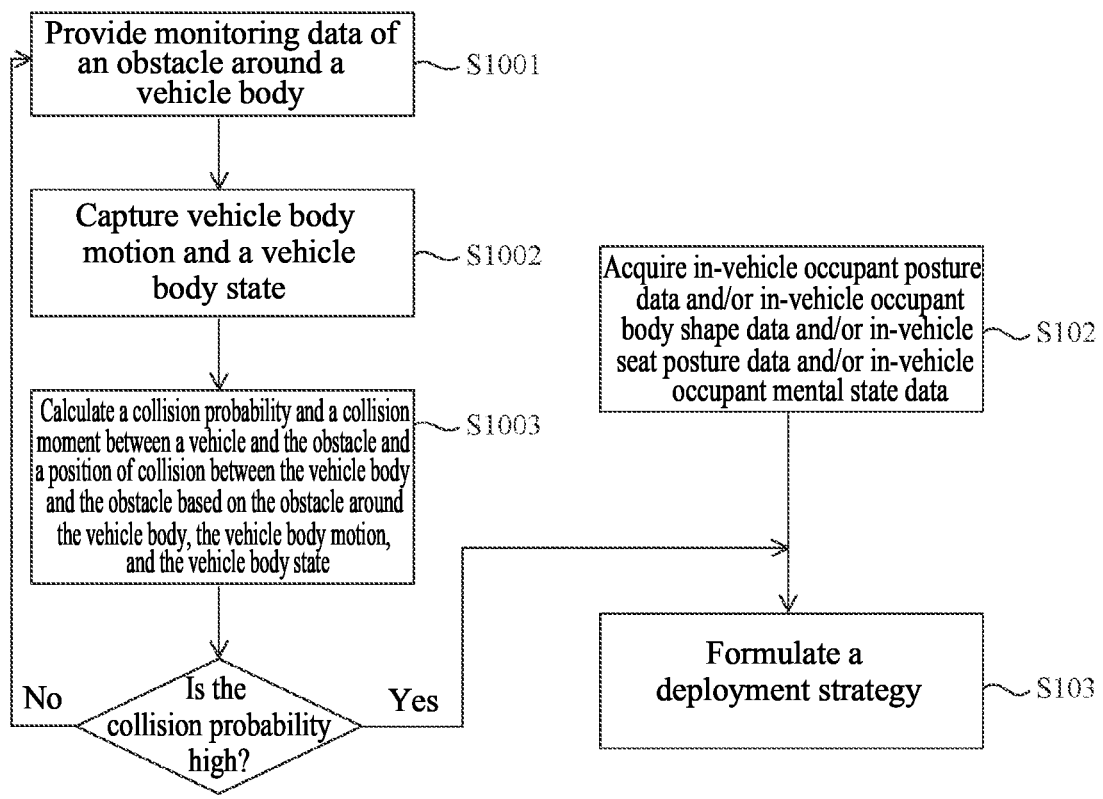
FIG. 2 is a schematic flowchart of a method for improving safety of an occupant by an airbag in an exemplary implementation.

The method for improving safety of an occupant by an airbag in Exemplary arrangement 1 may be as shown in FIG. 2. The method is applied to a vehicle, where the vehicle has an inflatable restraint system with a plurality of airbag assemblies. The method includes the following steps:

S102: acquiring in-vehicle occupant posture data, in-vehicle seat posture data, and/or in-vehicle occupant mental state data;

S1001: providing monitoring data of an obstacle around a vehicle body;

S1002: capturing vehicle body motion and a vehicle body state;

S1003: calculating a collision probability and a collision moment between a vehicle and the obstacle, and a position of collision between the vehicle body and the obstacle based on the obstacle around the vehicle body, the vehicle body motion, and the vehicle body state; and S103: formulating a deployment strategy.

If the collision probability is low, steps S1001 to S1003 are repeated. If the collision probability is high, the deployment strategy is formulated.

The formulated deployment strategy includes: selectively inflating at least one of the airbag assemblies 21 of the inflatable restraint system 2 based on the in-vehicle occupant posture data and/or the in-vehicle occupant body shape data and/or the in-vehicle seat posture data; selectively inflating at least one of the airbag assemblies 21 of the inflatable restraint system 2 based on the position of collision; and controlling an inflation volume for the airbag assembly 21 to be inflated based on a seat position and/or a sitting posture of an occupant.

In a future scenario of autonomous driving, an occupant is not always upright sitting in a seat, but usually leaning to the left, right or forward. In this case, the position of the occupant cannot be determined only by the position of the seat. The adaptive airbag deployment strategy formulated after observation of the positions of the occupant and seat in the vehicle by the in-vehicle observation system 1 can better protect occupants in different sitting postures, thereby improving the reliability of the in-vehicle airbag. The position of collision between the vehicle body and the obstacle is calculated to further reasonably optimize the establishment of the airbag deployment strategy before the collision occurs, so that a suitable airbag is adaptively deployed to a proper size based on the position of collision, thereby providing an optimal protection strategy for the occupant.

In addition, the integrated safety domain control unit 3 formulates the deployment strategy prior to the collision moment. In existing in-vehicle safety systems, seat positions are compared based on sensor information after detection of a collision, and a deployment strategy is then formulated based on an analysis result. As is well known, an airbag should deploy and expand in place within tens of milliseconds after a collision, so that occupants can be effectively protected. Formulating an effective deployment strategy prior to a collision can allow for a suitable airbag to expand within a short period of time after the collision, so as to protect the occupant, which further improves the reliability of the in-vehicle airbag.

Exemplary Arrangement 2

In Exemplary Arrangement 2, the following system or modules may also be added to Exemplary Arrangement 1, and only the added part will be described below.

The collision prediction system 4 further includes an Internet-of-vehicles module 44, which can provide distance information between vehicles through communication with other traveling vehicles and network systems. The Internet-of-vehicles module 44 can provide external information of the vehicle body together with the vehicle external information monitoring module 41, and the modeling unit continuously updates the modeling of the obstacle around the vehicle body in real time based on the external information of the vehicle body.

Exemplary Arrangement 3

In Exemplary Arrangement 3, the following system or modules may also be added to Exemplary Arrangement 1, and only the added part will be described below.

The integrated safety domain control unit 3 provides a collision determination based on the occupant mental state data and the collision probability. The collision determination includes: determining whether the occupant can be aware of a possibility of a collision. If the occupant can be aware of the possibility of the collision, a reminder strategy is formulated. The reminder strategy includes: pre-inflating or repeatedly inflating and deflating the airbag with a small volume of gas prior to the collision moment. It should be noted that the pre-inflation referred to here may involve providing a small volume of gas into the airbag through a suitable inflator such as a high-pressure gas storage tank. It can be understood that the small volume of gas inflation means that the inflation volume is less than an inflation volume in the airbag in the event of the collision.

In an exemplary arrangement, the airbag to be inflated with the small volume of gas to serve as a reminder may be a seat cushion airbag, a seat-mounted side airbag, a lumbar support airbag, or a combination thereof.

In an exemplary arrangement, the state capture unit 12 for acquiring the in-vehicle occupant mental state data is a camera and an in-vehicle radar, and the mental state data acquired thereby may include either or a combination of occupant health state data and occupant facial data. Specifically, the health state data monitored by the camera may include heartbeat information, etc., and information about the facial data may include facial emotional state information (such as excitement, rage), facial fatigue state information (such as a blinking frequency, yawn), facial gaze information (such as where a camera tracks the gaze of a person to determine whether a driver has noticed the obstacle), and facial orientation information (such as where the head turning of the occupant is determined, based on a facial orientation, for analysis, to determine whether the person pays attention in front). The in-vehicle radar can function to implement in-vehicle live detection and heartbeat detection.

An exemplary arrangement of the reminder strategy may be as follows. When heartbeat data of the occupant that is acquired by the state capture unit 12 is a first value and the blinking frequency of the occupant that is acquired by the state capture unit is a second value, it is determined, based on information from a database, that the occupant is in a first mental state at this time and can be aware of the occurrence of the collision. In this case, the deployment strategy is ready for execution.

Another exemplary arrangement of the reminder strategy may be as follows. When heartbeat data of the occupant that is acquired by the state capture unit 12 is a third value, the blinking frequency of the occupant that is acquired by the state capture unit is a fourth value, and a facial gaze of the occupant that is captured by the state capture unit is away from a road surface for more than a first time, it is determined, based on information from a database, that the occupant is in a second mental state at this time and can be aware of the occurrence of the collision. In this case, the reminder strategy is formulated.

Figure 3:
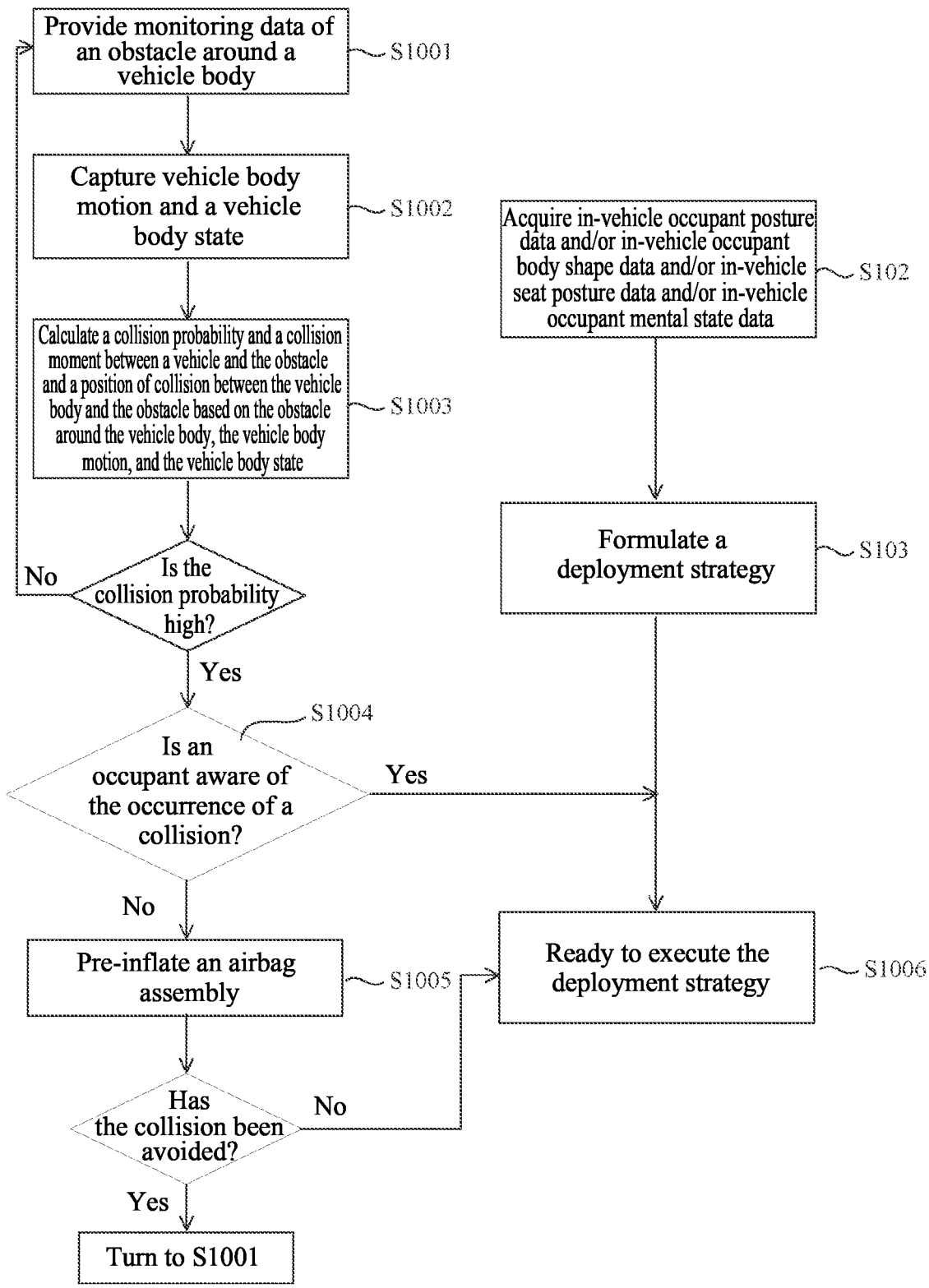
FIG. 3 is a schematic flowchart of a method for improving safety of an occupant by an airbag in another exemplary implementation.

The method for improving safety of an occupant by an airbag in Exemplary Arrangement 3 may be as shown in FIG. 3. In addition to the steps shown in FIG. 2, the method further includes:

S1004: determining, based on the in-vehicle occupant mental state data, the collision probability, and the collision moment, whether the occupant is aware of a possibility of a collision, and if not, turning to step S1005, and if yes, turning to step S1006;

S1005: pre-inflating the airbag assembly to remind the occupant of the collision;

and then determining whether the collision has been avoided, and if yes, turning to step S1001 to continue to monitor the obstacle around the vehicle body, and if not, turning to S1006; and S1006: being ready to execute the deployment strategy.

Exemplary Arrangement 4

In Exemplary Arrangement 4, the following system or modules may also be added to Exemplary Arrangement 1, and only the added part will be described below.

The system for improving safety of an occupant by an airbag further includes a cloud database and a simulation database, where the cloud database is configured to provide historical data of a vehicle collision, and the simulation database is configured to provide simulation data of the vehicle collision based on the modeling information. The calculation unit calculates a relative speed and a collision overlap rate between the vehicle and the obstacle during the collision based on the historical data and the simulation data, to further calculate the collision probability. Specifically, a distance by which the vehicle has traveled in a certain period of time is $S=VT$, and a speed thereof is $V=aT$. If deceleration cannot bring the speed down to 0 within a corresponding time and distance, the collision probability can be considered high. In addition, it also takes time to turn the vehicle at a certain angle. If it is unable to sufficiently turn the vehicle at an angle within the corresponding time and distance, the collision cannot be avoided. The collision position and overlap rate of when a collision occurs can be calculated by calculating an angle at which the vehicle can be turned in a limited time.

An exemplary arrangement of calculating the collision probability may be as follows. The cloud database provides historical data of vehicle collisions as a first collision model, the simulation database is used to provide, based on the modeling information, simulation data of the vehicle collisions as a second collision model, and the calculation unit calculates, by fusing data information of the first collision model and the second collision model, the relative speed between the vehicle and the obstacle during the collision as a first speed and the collision overlap rate as a first overlap rate. In this case, the collision probability is calculated as a first probability based on the first speed and a first collision position.

Exemplary Arrangement 5

In Exemplary Arrangement 5, the following system or modules may also be added to Embodiments 1 to 4, and only the added part will be described below.

The system for improving safety of an occupant further includes a collision sensor, where the collision sensor may be configured to monitor vehicle body collision information of the vehicle body and vehicle body collision degree information and to transmit the information to the integrated safety domain control unit 3, and the integrated safety domain control unit 3 controls, based on the received information, the inflatable restraint system 2 to inflate the airbag according to the deployment strategy.

Figure 4:
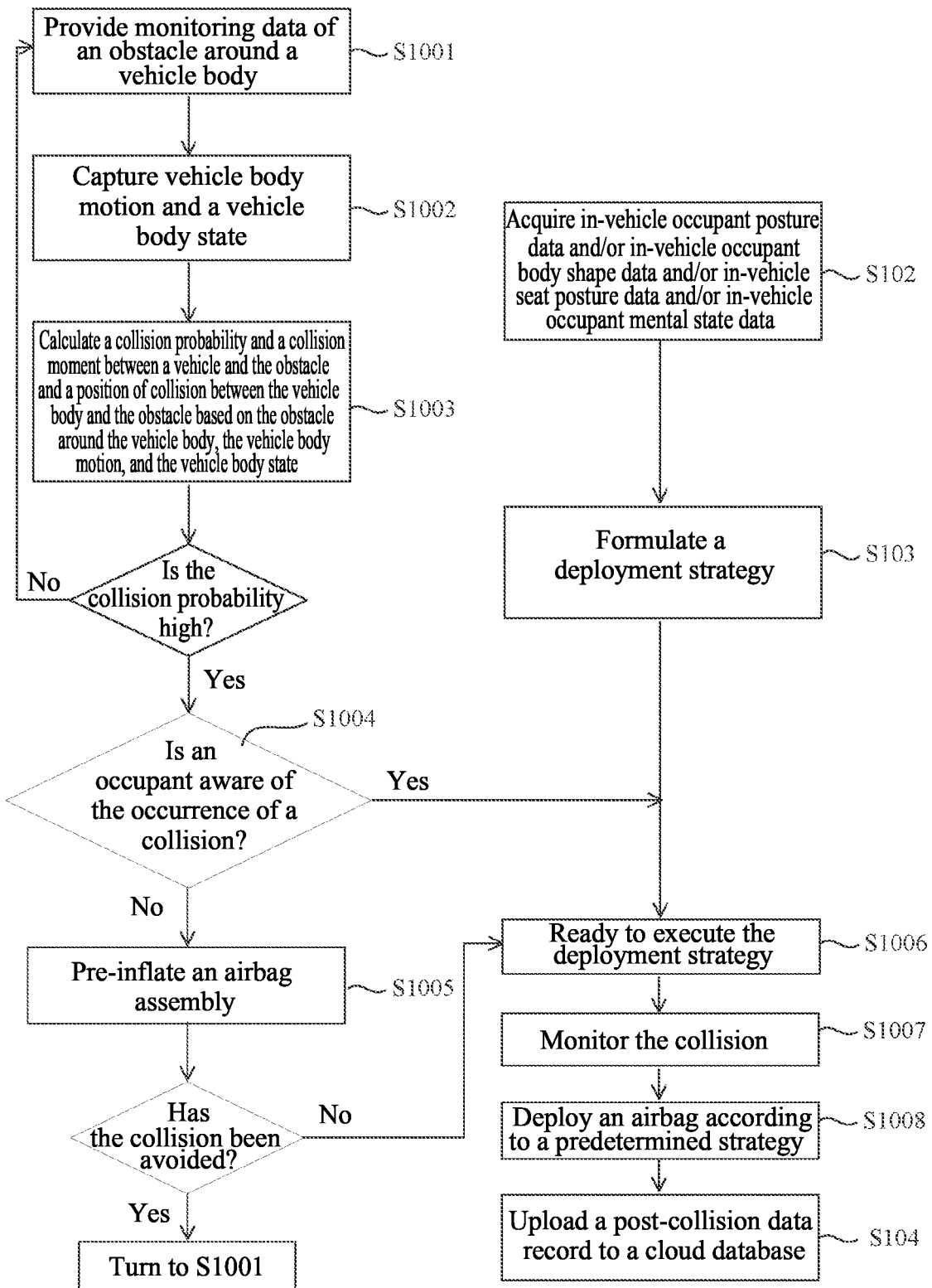
FIG. 4 is a schematic flowchart of a method for improving safety of an occupant by an airbag in still another exemplary implementation.

The method for improving safety of an occupant by an airbag in Exemplary Arrangement 5 may be as shown in FIG. 4. In addition to the steps shown in FIG. 3, the method further includes:

S1007: monitoring a collision by a vehicle body sensor;

S1008: deploying the airbag according to a preset strategy; and

S104: uploading a post-collision data record to a cloud database.

According to another aspect of the present disclosure, a computer-readable storage medium is further provided herein.

The above computer-readable storage medium provided in the present disclosure has computer instructions stored thereon. When the computer instructions are executed by a processor, at least some of the steps in the method for improving safety of an occupant by an airbag provided in any one of the foregoing exemplary arrangements may be implemented, such that a suitable airbag can be expanded within a short period of time after the collision, so as to protect the occupant, which further improves the reliability of the in-vehicle airbag.

The steps of the method or algorithm described in conjunction with the exemplary arrangements disclosed herein may be embodied directly in hardware, in a software module executed by a processor, or in a combination of the two. The software module may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to a processor such that the processor can read and write information from/to the storage medium. In an alternative, the storage medium may be integrated into the processor. The processor and the storage medium may reside in an ASIC. The ASIC may reside in a user terminal. In an alternative, the processor and the storage medium may reside in the user terminal as discrete assemblies.

In one or more exemplary arrangements, the functions described may be implemented in hardware, software, firmware, or any combination thereof. If implemented as a computer program product in software, the functions may be stored on or transmitted over a computer-readable medium as one or more instructions or code. The computer-readable medium includes both a computer storage medium and a communication medium including any medium that facilitates transfer of a computer program from one place to another. The storage medium may be any available medium that can be accessed by a computer. By way of example, without limitation, such a computer-readable medium may include a RAM, a ROM, an EEPROM, a CD-ROM or other optical disk storage, magnetic disk storage or other magnetic storage devices, or any other media that can be used to carry or store suitable program code in the form of instructions or data structures and that can be accessed by a computer. Any connection is also properly termed a computer-readable medium. For example, if the software is transmitted from a web site, a server, or other remote sources using a coaxial cable, a fiber optic cable, a twisted pair, a digital subscriber line (DSL), or wireless technologies such as infrared, radio, and microwaves, the coaxial cable, the fiber optic cable, the twisted pair, the DSL, or the wireless technologies such as infrared, radio, and microwaves are included in the definition of the medium. The disk and disc as used herein include a compact disc (CD), a laser disc, an optical disc, a digital versatile disc (DVD), a floppy disk, and a blu-ray disc, where the disk is often used to magnetically reproduce data, and the disc is used to optically reproduce data by using laser light. A combination of the above should also be included within the range of the computer-readable medium.

Although the present disclosure is disclosed above with exemplary arrangements, the exemplary arrangements are not intended to limit the present disclosure. Any person skilled in the art can make possible changes and alterations without departing from the spirit and scope of the present disclosure. Therefore, any alteration, equivalent change and modification made to the above exemplary arrangements in accordance with the technical substance of the present disclosure without departing from the content of the technical solutions of the present disclosure shall fall within the scope of protection defined by the claims of the present disclosure.

The invention claimed is:

1. A system for improving safety of an occupant by an airbag, comprising:
an in-vehicle observation system configured to acquire in-vehicle occupant posture data and/or in-vehicle occupant body shape data and/or in-vehicle seat posture data and/or in-vehicle occupant mental state data;
an inflatable restraint system, which comprises a plurality of airbag assemblies; and
a collision prediction system, which comprises:
a vehicle external information monitoring module configured to monitor an obstacle around a vehicle body;
a vehicle body posture monitoring module configured to monitor vehicle body motion and a vehicle body posture; and
an integrated safety domain control unit configured to: calculate a collision probability and a collision moment between the vehicle body and the obstacle, and a position of collision between the vehicle body and the obstacle based on the vehicle external information monitoring module and the vehicle body posture monitoring module; and receive the data acquired by the in-vehicle observation system, and formulate a deployment strategy prior to the collision moment based on at least one piece of the received data,
wherein the deployment strategy comprises:
selectively inflating at least one of the airbag assemblies of the inflatable restraint system based on the in-vehicle occupant posture data and/or the in-vehicle occupant body shape data and/or the in-vehicle seat posture data;
selectively inflating at least one of the airbag assemblies of the inflatable restraint system based on the position of collision; and
controlling an inflation volume for the airbag assembly to be inflated based on a seat position and/or a sitting posture of an occupant.

2. The system for improving safety of an occupant by an airbag of claim 1, wherein the collision prediction system further comprises an Internet-of-vehicles module, which provides external information of the vehicle body together with the vehicle external information monitoring module.

3. The system for improving safety of an occupant by an airbag of claim 1, wherein the integrated safety domain control unit provides a collision determination based on the in-vehicle occupant mental state data and the collision probability, and if a result of the collision determination indicates Yes, the integrated safety domain control unit formulates a reminder strategy based on the collision determination,
the reminder strategy comprising pre-inflating the airbag assembly prior to the collision moment.

4. The system for improving safety of an occupant by an airbag of claim 1, wherein the vehicle external information monitoring module comprises one or a combination of a millimeter wave radar, an ultrasonic radar, a laser radar, and an external camera.

5. The system for improving safety of an occupant by an airbag of claim 1, wherein the vehicle body posture monitoring module comprises a speed sensor, a yaw velocity sensor, and a steering wheel angle sensor,
wherein the speed sensor is configured to monitor the vehicle body motion, and the yaw velocity sensor and the steering wheel angle sensor are configured to monitor the vehicle body posture.

6. The system for improving safety of an occupant by an airbag of claim 1, wherein the integrated safety domain control unit comprises a modeling unit and a calculation unit, wherein the modeling unit is configured to model the obstacle based on monitoring information from the vehicle external information monitoring module, and to model the vehicle body based on monitoring information from the vehicle body posture monitoring module; and
the calculation unit is configured to calculate the collision probability based on modeling information.

7. The system for improving safety of an occupant by an airbag of claim 6, wherein the system further comprises a cloud database and a simulation database, wherein the cloud database is configured to provide historical data of a vehicle collision, and the simulation database is configured to provide simulation data of the vehicle collision based on the modeling information; and
the calculation unit calculates a relative speed and a collision overlap rate between the vehicle body and the obstacle during the collision based on the historical data and the simulation data.

8. The system for improving safety of an occupant by an airbag of claim 1, wherein the in-vehicle observation system comprises an image acquisition unit and a state capture unit, wherein the image acquisition unit is configured to acquire the in-vehicle occupant posture data, the in-vehicle occupant body shape data, and the in-vehicle seat posture data; and the state capture unit is configured to acquire the in-vehicle occupant mental state data.

9. The system for improving safety of an occupant by an airbag of claim 8, wherein the image acquisition unit is either or a combination of a 3D camera and a 2D camera.

10. The system for improving safety of an occupant by an airbag of claim 8, wherein the state capture unit is a camera and/or an in-vehicle radar.

11. The system for improving safety of an occupant by an airbag of claim 8, wherein the in-vehicle occupant posture data comprises occupant torso position data and/or occupant joint position data.

12. The system for improving safety of an occupant by an airbag of claim 8, wherein the in-vehicle seat posture data comprises either or a combination of seat position data and seat back angle data.

13. The system for improving safety of an occupant by an airbag of claim 8, wherein the mental state data comprises either or a combination of occupant health state data and occupant facial data.

14. The system for improving safety of an occupant by an airbag of claim 1, wherein the system further comprises a collision sensor, wherein the collision sensor is configured to monitor vehicle body collision information and vehicle body collision degree information and to transmit the information to the integrated safety domain control unit, and the integrated safety domain control unit controls, based on the received information, the inflatable restraint system to inflate the airbag assembly according to the deployment strategy.

15. A method for improving safety of an occupant by an airbag, wherein the method is applied to a vehicle, wherein the vehicle has an inflatable restraint system with a plurality of airbag assemblies, the method comprising:
acquiring in-vehicle occupant posture data and/or in-vehicle occupant body shape data and/or in-vehicle seat posture data and/or in-vehicle occupant mental state data;
capturing monitoring data of an obstacle around a vehicle body;
capturing vehicle body motion and a vehicle body state;
calculating a collision probability and a collision moment between the vehicle and the obstacle, and a position of collision between the vehicle body and the obstacle based on the obstacle around the vehicle body, the vehicle body motion, and the vehicle body state; and
formulating a deployment strategy, which comprises:
selectively inflating at least one of the airbag assemblies of the inflatable restraint system based on the in-vehicle occupant posture data and/or the in-vehicle occupant body shape data and/or the in-vehicle seat posture data;
selectively inflating at least one of the airbag assemblies of the inflatable restraint system based on the position of collision; and
controlling an inflation volume for the airbag assembly to be inflated based on a seat position and/or a sitting posture of an occupant.

16. The method for improving safety of an occupant by an airbag of claim 15, further comprising:
determining, based on the in-vehicle occupant mental state data, the collision probability, and the collision moment, whether the occupant is aware of a possibility of a collision, and if not, pre-inflating the airbag assembly.

17. The method for improving safety of an occupant by an airbag of claim 15, further comprising:
executing the deployment strategy based on a collision signal detected by a collision sensor; and
uploading a post-collision data record to a cloud database.

18. A computer-readable medium having computer instructions stored thereon, wherein when the computer instructions are executed by a processor, the steps of the method for improving safety of an occupant by an airbag of claim 15 is implemented.

* * * * *

UNITED STATES PATENT AND TRADEMARK OFFICE
CERTIFICATE OF CORRECTION

| | | |
|---|---|---|
| PATENT NO. | : 11,820,320 B2 | Page 1 of 1 |
| APPLICATION NO. | : 17/917186 | |
| DATED | : November 21, 2023 | |
| INVENTOR(S) | : Hui Yang, Zhenfei Wang and Yuanyi Cheng | |

It is certified that error appears in the above-identified patent and that said Letters Patent is hereby corrected as shown below:

On the Title Page

In Item (71) of the Applicant, please change the Applicant Name to -- ZF ASIA PACIFIC AUTOMOTIVE SAFETY SYSTEMS (SHANGHAI) CO. --.

In Item (73) of the Assignee, please change the Assignee Name to -- ZF ASIA PACIFIC AUTOMOTIVE SAFETY SYSTEMS (SHANGHAI) CO. --.

Signed and Sealed this
Eighth Day of April, 2025

Coke Morgan Stewart
*Acting Director of the United States Patent and Trademark Office*